(12) United States Patent
Leiponis et al.

(10) Patent No.: US 9,983,462 B2
(45) Date of Patent: May 29, 2018

(54) ADJUSTABLE CAMERA ENCLOSURE

(71) Applicant: Parabit Systems, Inc., Roosevelt, NY (US)

(72) Inventors: Robert J. Leiponis, Glen Cove, NY (US); Luis Vega, Clifton, NJ (US); Dennis Schmitz, Commack, NY (US)

(73) Assignee: Parabit Systems, Inc., Roosevelt, NY (US)

( * ) Notice: Subject to any disclaimer, the term of this patent is extended or adjusted under 35 U.S.C. 154(b) by 0 days. days.

(21) Appl. No.: 15/395,518

(22) Filed: Dec. 30, 2016

(65) Prior Publication Data

US 2017/0192343 A1    Jul. 6, 2017

Related U.S. Application Data

(60) Provisional application No. 62/273,028, filed on Dec. 30, 2015.

(51) Int. Cl.
| | |
|---|---|
| *H04N 7/18* | (2006.01) |
| *G03B 17/56* | (2006.01) |
| *H04N 5/225* | (2006.01) |
| *G03B 17/02* | (2006.01) |

(52) U.S. Cl.
CPC .......... *G03B 17/561* (2013.01); *G03B 17/02* (2013.01); *H04N 5/2252* (2013.01); *H04N 5/2253* (2013.01); *H04N 5/2254* (2013.01)

(58) Field of Classification Search
CPC ............. G08G 1/04; G08G 3/00; H04N 7/188
See application file for complete search history.

(56) References Cited

U.S. PATENT DOCUMENTS

| | | |
|---|---|---|
| D399,517 S | 10/1998 | Hasegawa |
| D425,534 S | 5/2000 | Mutoh et al. |
| D455,164 S | 4/2002 | Tsang |
| D456,432 S | 4/2002 | Kim |
| 6,375,370 B1 * | 4/2002 | Wesselink .............. G03B 17/00 348/143 |
| D477,345 S | 7/2003 | Hildreth |

(Continued)

OTHER PUBLICATIONS

Covert Color Camera, Tower Camera CTV36PB; Specification Sheet; Advanced Technology Video; pp. 1-2; Copyright 2011.

(Continued)

*Primary Examiner* — Trung Diep
(74) *Attorney, Agent, or Firm* — Gerald E. Hespos; Michael J. Porco; Matthew T. Hespos

(57) ABSTRACT

An adjustable camera enclosure is provided. In one aspect of the present disclosure, the adjustable camera enclosure includes a housing including a hollow interior defining a longitudinal axis and at least one aperture in a wall of the housing; a beam disposed through an end of the housing into the hollow interior of the housing such that the beam is disposed along the longitudinal axis, where the housing is slidable over the beam along the longitudinal axis to extend and retract the housing relative to the beam; a camera disposed within the hollow interior of the housing, where a lens of the camera is oriented to the at least one aperture of the housing in a direction away from the housing; and a base coupled to the beam, where the base is rotatable about the longitudinal axis to rotate the beam and the housing about the longitudinal axis.

21 Claims, 18 Drawing Sheets

(56) References Cited

U.S. PATENT DOCUMENTS

| | | |
|---|---|---|
| D486,847 S | 2/2004 | Uehara |
| D487,764 S | 3/2004 | Adachi et al. |
| D501,494 S | 2/2005 | Ogura |
| D517,585 S | 3/2006 | Iino et al. |
| D520,548 S | 5/2006 | Tsai |
| D532,809 S | 11/2006 | Shih |
| D535,204 S | 1/2007 | Bender et al. |
| D542,319 S | 5/2007 | Ishida et al. |
| D543,567 S | 5/2007 | Kato et al. |
| 7,217,044 B1 * | 5/2007 | Marks, Jr. ............... F16M 11/12 348/376 |
| D550,266 S | 9/2007 | Lau |
| D550,267 S | 9/2007 | Oh |
| D552,650 S | 10/2007 | Yamakawa et al. |
| D554,168 S | 10/2007 | Shi |
| 7,346,196 B2 * | 3/2008 | Gin .................... G06K 9/00221 348/151 |
| D579,474 S | 10/2008 | Yoo et al. |
| D597,117 S | 7/2009 | Yamane et al. |
| 7,710,452 B1 * | 5/2010 | Lindberg ............... H04N 7/188 348/149 |
| D624,106 S | 9/2010 | Cho et al. |
| D651,229 S | 12/2011 | Tan |
| 8,593,567 B2 | 11/2013 | Xiao |
| D708,654 S | 7/2014 | Tani |
| D718,360 S | 11/2014 | Matoba et al. |
| D723,395 S | 3/2015 | Dispenza et al. |
| D750,681 S | 3/2016 | Takami |
| D751,129 S | 3/2016 | Lellky |
| D757,146 S | 5/2016 | Walter |
| D771,174 S | 11/2016 | Hinkel |
| 9,826,128 B1 * | 11/2017 | Ballard ................ H04N 5/2251 |
| 2004/0139812 A1 * | 7/2004 | Erel ................ G08B 13/19619 74/89.23 |
| 2006/0250260 A1 * | 11/2006 | Albert ................ G06F 19/3418 340/628 |
| 2013/0107110 A1 | 5/2013 | Park |

OTHER PUBLICATIONS

Tower Camera Quick Installation Guide; Advanced Technology Video; pp. 1-12.

* cited by examiner

ADJUSTABLE CAMERA ENCLOSURE

PRIORITY CLAIM

This application claims priority to U.S. Provisional Patent Application No. 62/273,028, filed Dec. 30, 2015, entitled "ADJUSTABLE CAMERA ENCLOSURE", the contents of which are hereby incorporated by reference in its entirety.

TECHNICAL FIELD

The present disclosure generally relates to camera systems, and more particularly, to an adjustable camera enclosure.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

Cameras are used in many settings to take photographs or videos of individuals for identification and/or security purposes. A camera may be used to take a photograph of an individual to save in a database for later reference and/or to create an identification card. Alternatively, a camera may be used to take a photograph or a video for security and surveillance purposes. In many cases, after a camera has been mounted, the camera cannot be easily manipulated to achieve desired viewing angles. Therefore, a need exists for cameras that can be adjusted in a plurality of ways.

SUMMARY

The present disclosure provides for an adjustable camera enclosure. The camera enclosure of the present disclosure is configured to house a variety of different types of cameras, e.g., a miniature camera. Furthermore, the camera enclosure of the present disclosure is configured such that the camera enclosure can be adjusted in a plurality of ways to ensure the camera housed within the camera enclosure can achieve a desired viewing angle. The adjustable camera enclosure of the present disclosure is configured to be mounted to a flat surface, e.g., a desk, countertop, etc.

According to one aspect of the present disclosure, an apparatus is provided including a housing including a hollow interior defining a longitudinal axis, the housing including a first end and a second end and at least one aperture in a wall of the housing; a beam including a first end and a second end, the first end of the beam disposed through the second end of the housing into the hollow interior of the housing such that the beam is disposed along the longitudinal axis, wherein the housing is configured to be slidable over the beam along the longitudinal axis to extend and retract the housing relative to the beam; a camera disposed within the hollow interior of the housing, wherein a lens of the camera is oriented to the at least one aperture of the housing in a direction away from the housing; and a base coupled to the second end of the beam, wherein the base is configured to be rotatable about the longitudinal axis to rotate the beam and the housing about the longitudinal axis.

In another aspect of the present disclosure, the apparatus further includes a camera mounting assembly configured to mount the camera within the hollow interior of the housing and tilt the camera in a direction toward the first end of the housing or the second end of the housing.

In another aspect of the present disclosure, the apparatus further includes a mounting member coupled to the base such that the base is rotatable about the mounting member, wherein the mounting member is configured to be fixedly mounted to a surface.

BRIEF DESCRIPTION OF THE DRAWINGS

In the drawings, wherein like reference numerals denote similar elements throughout the views.

It should be understood that the drawings are for purposes of illustrating the concepts of the present disclosure and are not necessarily the only possible configurations for illustrating the present disclosure.

DETAILED DESCRIPTION

Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The present disclosure provides for an adjustable camera enclosure. The camera enclosure of the present disclosure is configured to house a variety of different types of cameras, e.g., a miniature camera. Furthermore, the camera enclosure of the present disclosure is configured such that the camera enclosure can be adjusted in a plurality of ways to ensure the camera housed within the camera enclosure can achieve a desired viewing angle. The adjustable camera enclosure of the present disclosure is configured to be mounted to a flat surface, e.g., a desk, countertop, etc.

Figure 1:
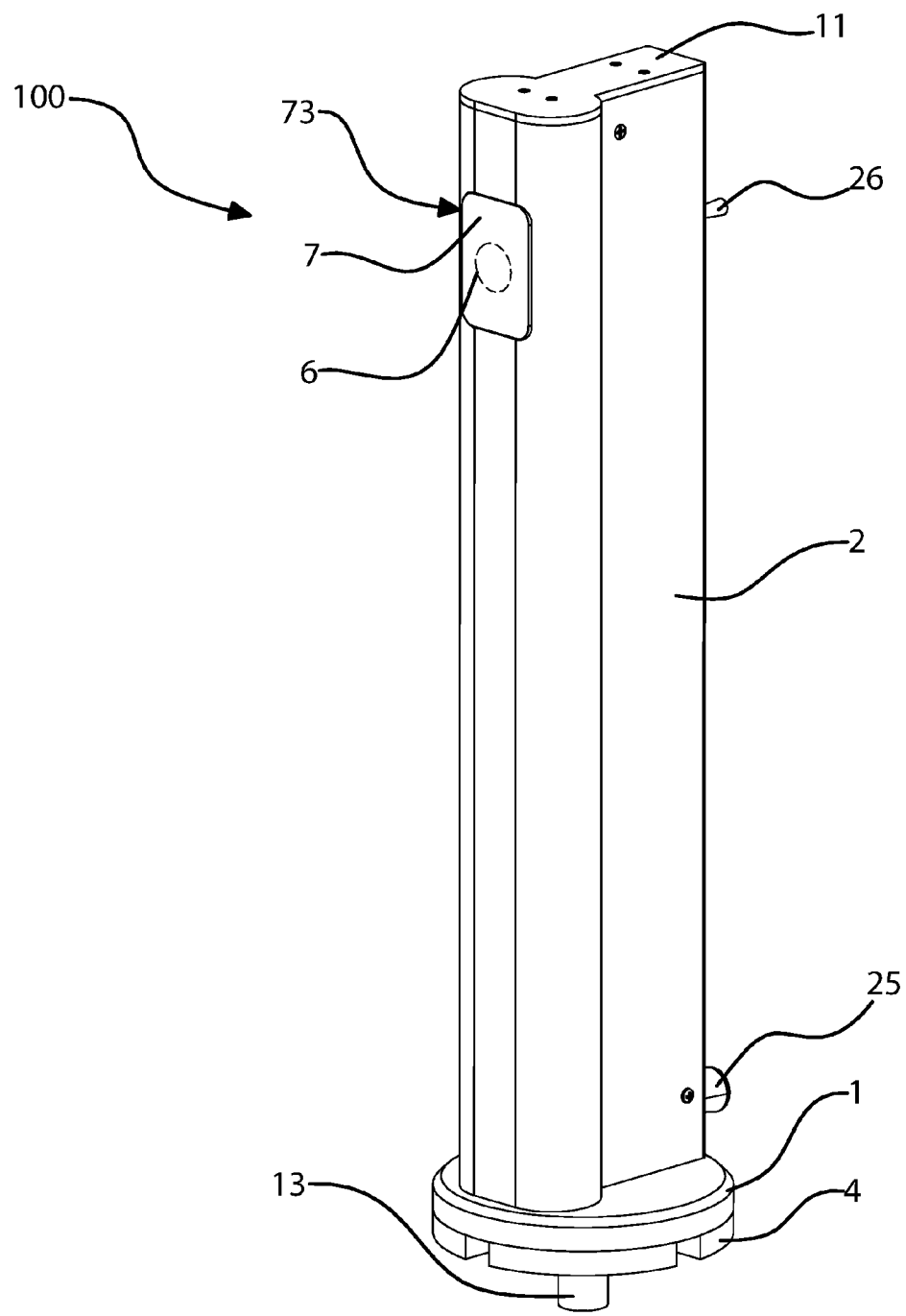
FIG. 1 is perspective view of a camera enclosure in accordance with an embodiment of the present disclosure.

Referring to FIG. 1, a camera enclosure apparatus 100 is shown in accordance with an embodiment of the present disclosure. Camera enclosure 100 includes lid or cover 11, main body or housing 2, base 1, mounting member or plate 4, and conduit 13. As seen in FIG. 1, lid 11 is coupled to main body 2, where main body 2 includes camera window 7 disposed in an aperture 73 of main body 2. It is to be appreciated that, in one embodiment, camera window 7 is made of glass, although other transparent materials are contemplated to be within the scope of the present disclosure. As will be described in greater detail below, camera enclosure 100 is configured such that a miniature camera 6, such as, but not limited to, an IP (Internet Protocol) camera or analog camera, may be coupled to lid 11 via a camera mounting assembly and disposed within the interior of main body 2 with the lens of the camera 6 facing camera window 7 (i.e., viewing toward the exterior of body 2).

Figure 2:
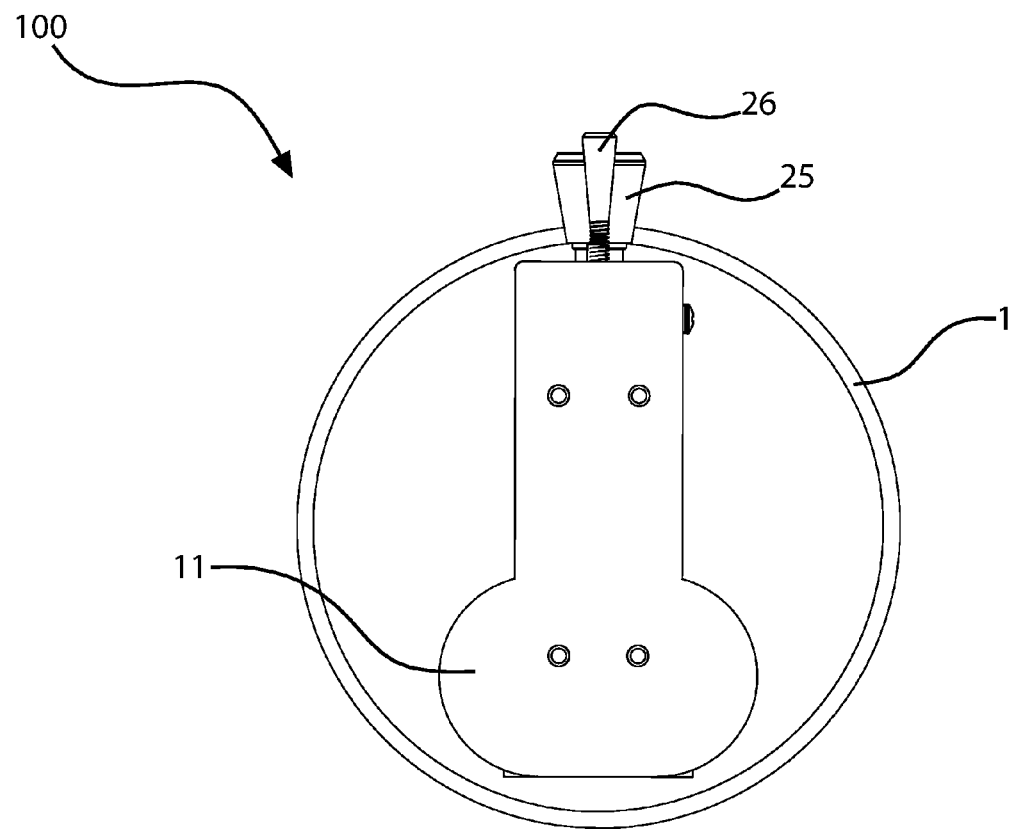
FIG. 2 is top view of the camera enclosure of FIG. 1 in accordance with the present disclosure.
Figure 3:
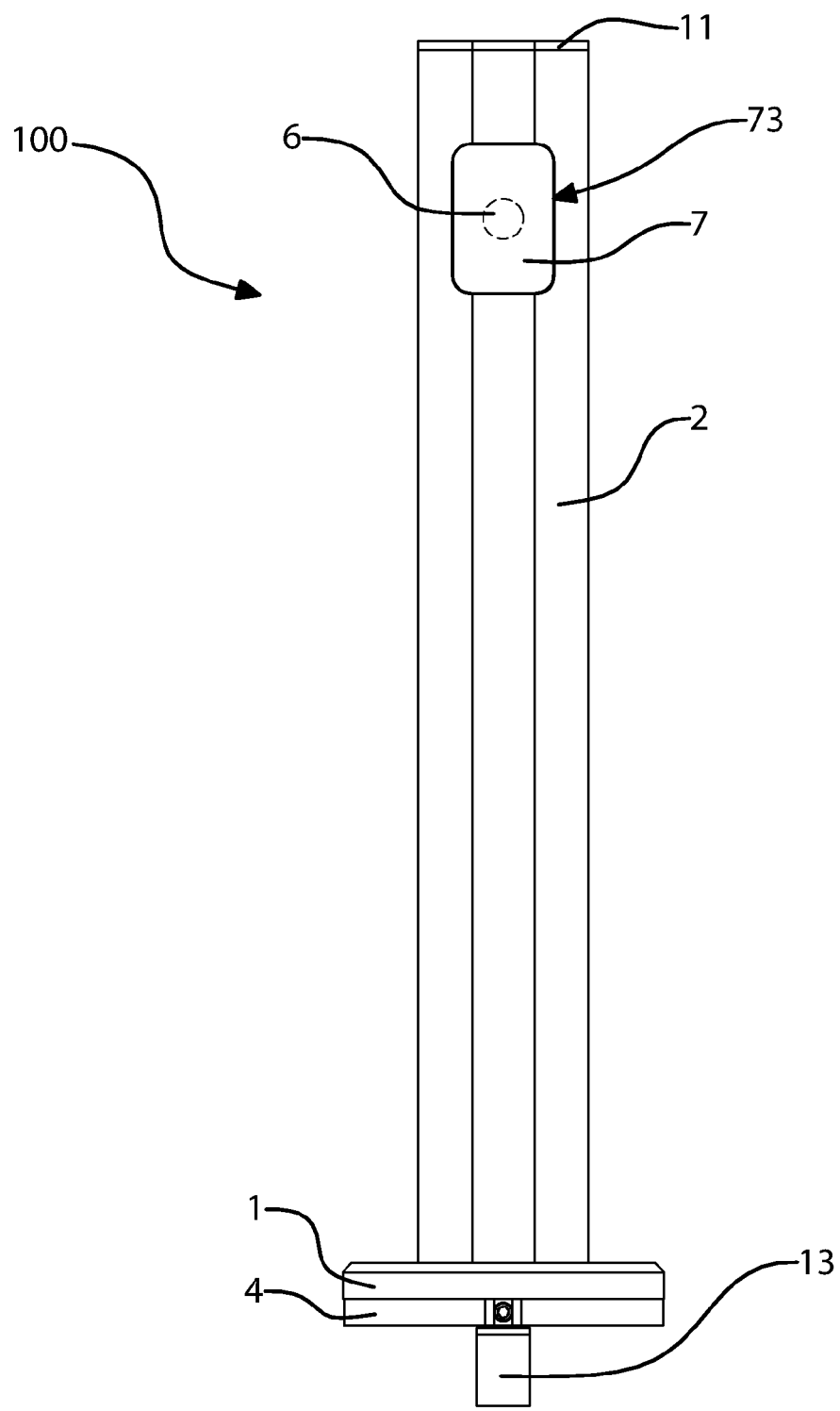
FIG. 3 is a front view of the camera enclosure of FIG. 1 in accordance with the present disclosure.
Figure 4:
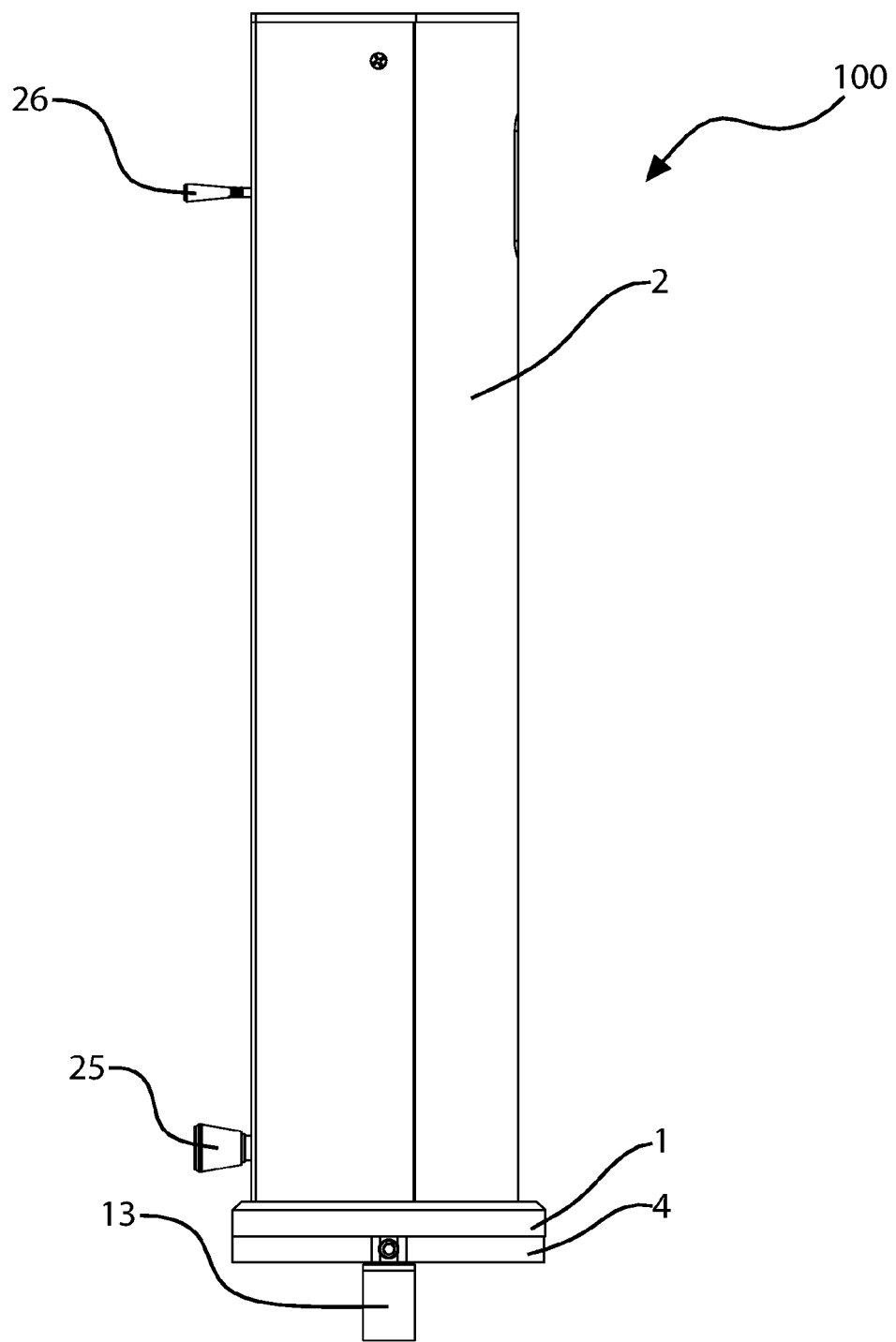
FIG. 4 is a side view of the camera enclosure of FIG. 1 in accordance with the present disclosure.
Figure 5:
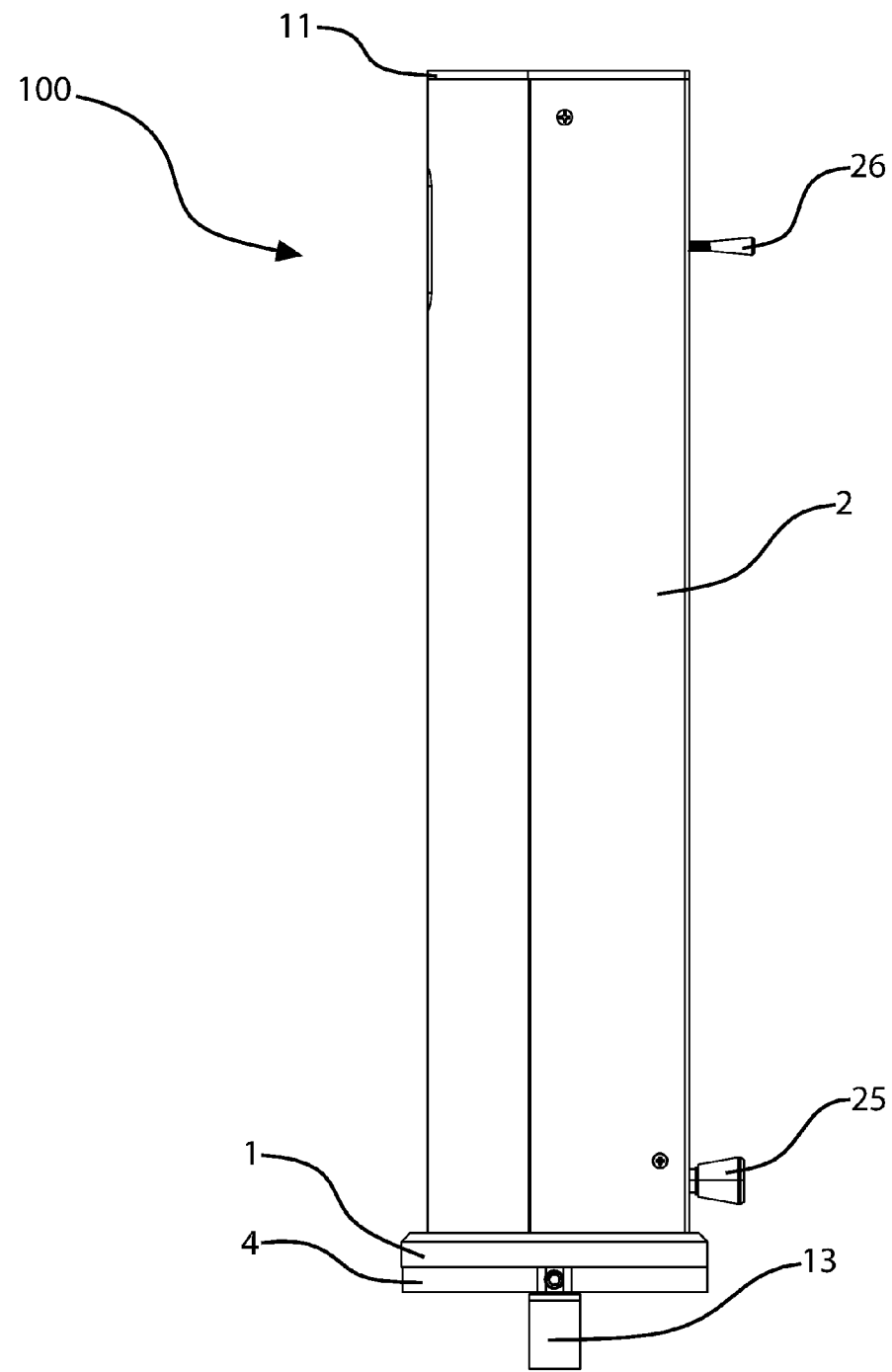
FIG. 5 is a side view of the camera enclosure of FIG. 1 opposite to the side view shown in FIG. 4 in accordance with the present disclosure.
Figure 6:
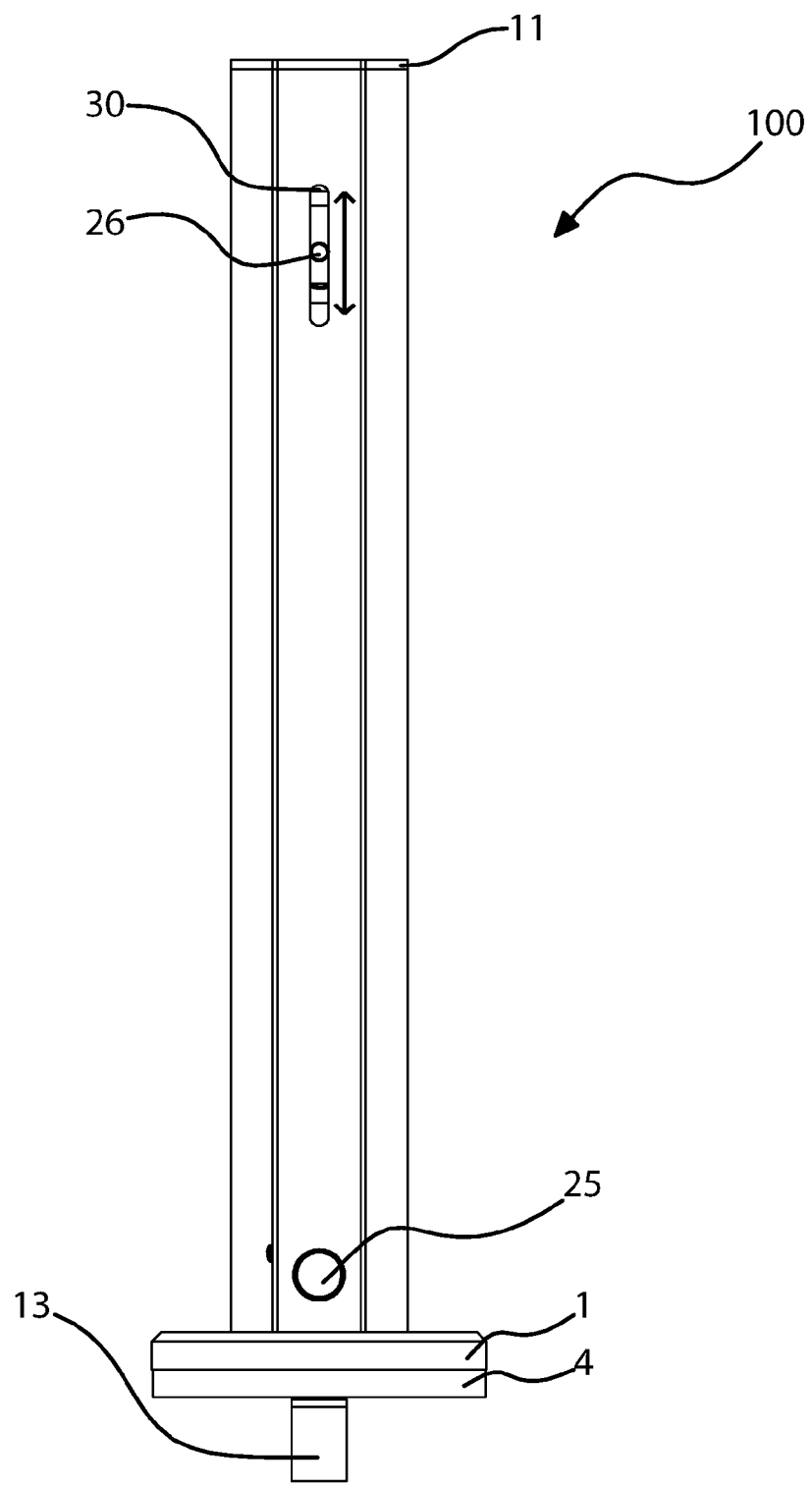
FIG. 6 is a rear view of the camera enclosure of FIG. 1 in accordance with the present disclosure.

Referring to FIGS. 2-6 various alternate views of enclosure 100 are shown in accordance with the present disclosure, where FIG. 2 is a top view, FIG. 3 is a front view, FIG. 4 is a side-view, FIG. 5 is an opposite side-view, and FIG. 6 is a rear-view of enclosure 100. As seen in FIGS. 2, 4, 5, and 6, enclosure 100 includes a tilt angle adjustor or lever 26 and a camera height adjustor 25 coupled to main body 2. Lever 26 is configured to adjust the tilt angle of camera 6, where the lever 26 may be advanced by a user along a slot 30 toward lid 11 to tilt the camera 6 inside enclosure 100 toward base 1, or alternatively, camera angle adjuster 26 may be advanced by a user along the slot 30 toward base 1 to tilt the camera 6 inside enclosure 100 toward lid 11, as will be described in greater detail below. In one embodiment, camera height adjustor 25 is a spring plunger that can be pulled in a direction away from main body 2 to lift or lower main body 2 away from or toward base 1, as will be described in greater detail below.

Figure 7:
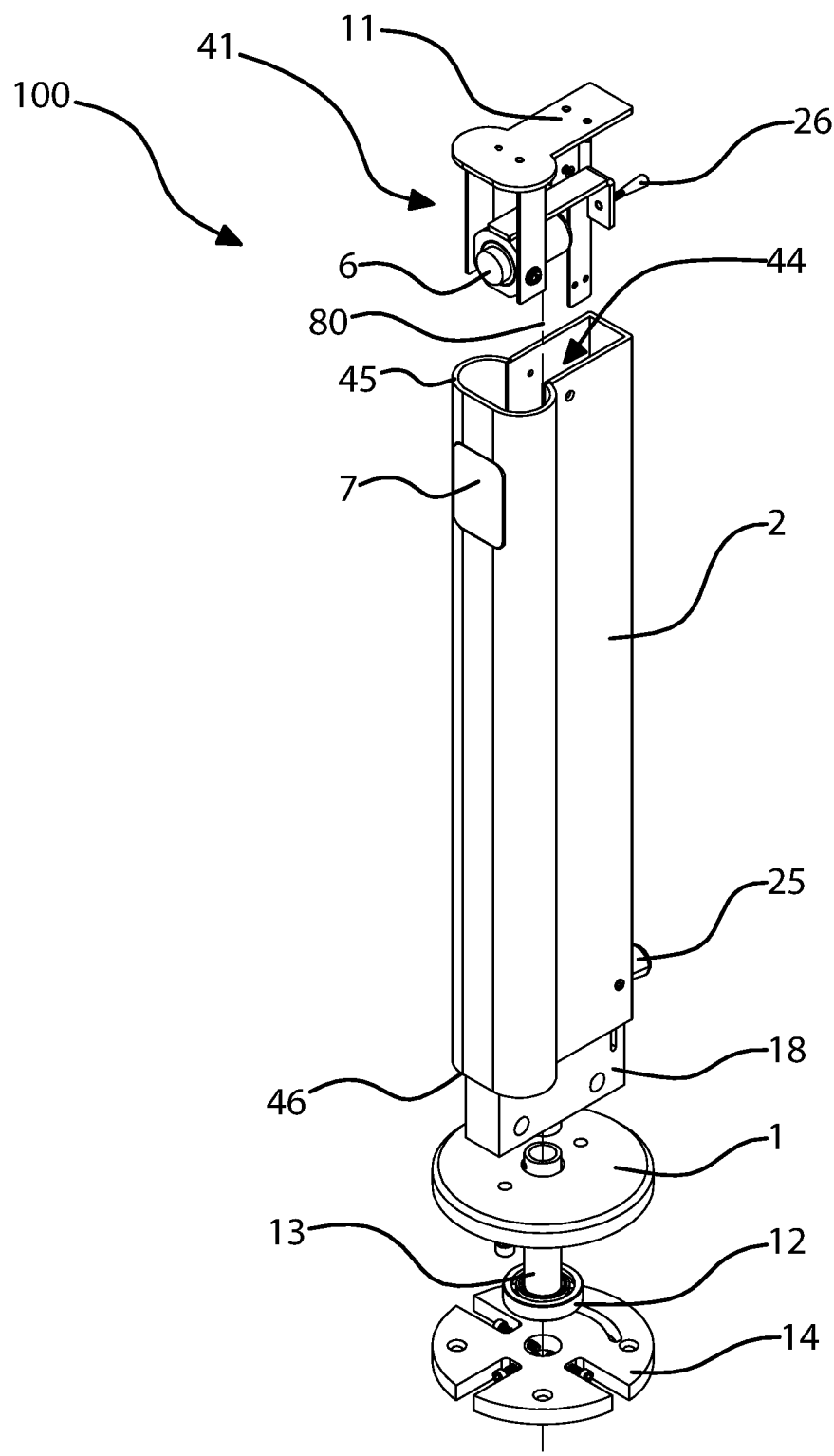
FIG. 7 is an exploded perspective view of the camera enclosure of FIG. 1 in accordance with the present disclosure.

Referring to FIG. 7, an exploded perspective view of enclosure 100 is shown in accordance with the present disclosure. As seen in FIG. 7, main body 2 of enclosure 100 includes an end 45 and an opposite end 46. Furthermore, main body 2 includes a hollow interior 44, where main body 44 defines a longitudinal axis 80. Lid 11 is coupled to end 45 of main body 2. Also, lid 11 is coupled to a camera mounting assembly 41, such that, when lid 11 is coupled to end 45 of main body 2, camera mounting assembly 41 is disposed in the hollow interior 44 of main body 2. Also shown in FIG. 7, is a beam 18 disposed in the hollow interior 44 of side 46 of main body 2 along longitudinal axis 80. It is to be appreciated that main body 2 is configured to slide along beam 18 along longitudinal axis 80, as will be described in greater detail below. Beam 18 is coupled to a base 1, where base 1 is coupled to a bearing 12 configured to allow base 1 (and therefore, main body 2 and beam 18) to be rotated in a clockwise or counter-clockwise motion about conduit 13 and longitudinal axis 80. It is to be appreciated that conduit 13 extends through apertures in mounting plate 4, bearing 12, and base 1 into beam 18, as will be described in greater detail below.

Figure 8A:
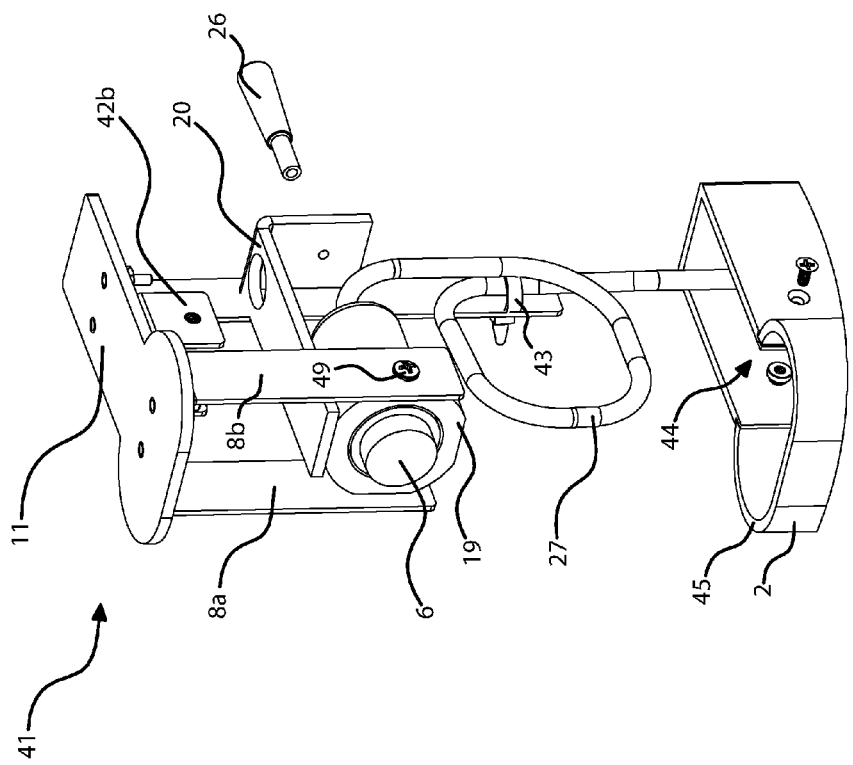
FIG. 8A is a perspective view of a camera mounting assembly of the camera enclosure of FIG. 1 in accordance with the present disclosure.
Figure 8C:
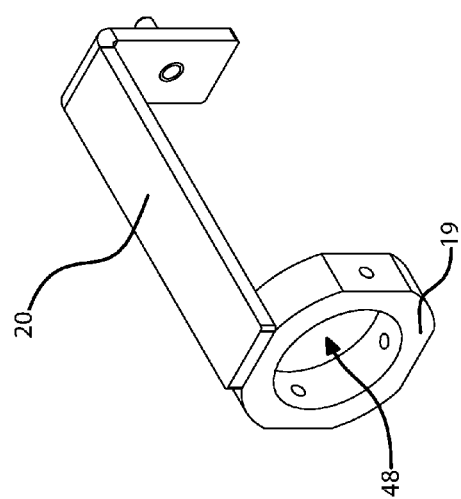
FIG. 8C is a perspective view of a camera mount and a tilting member of the camera mounting assembly of FIG. 8A in accordance with the present disclosure.
Figure 8B:
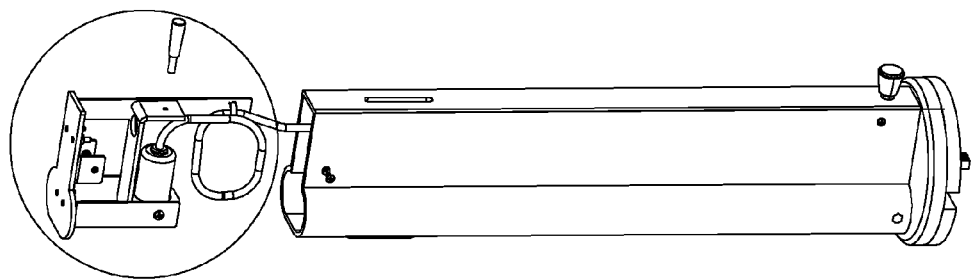
FIG. 8B is another perspective view of the camera mounting assembly of FIG. 8A in accordance with the present disclosure.
Figure 8B:
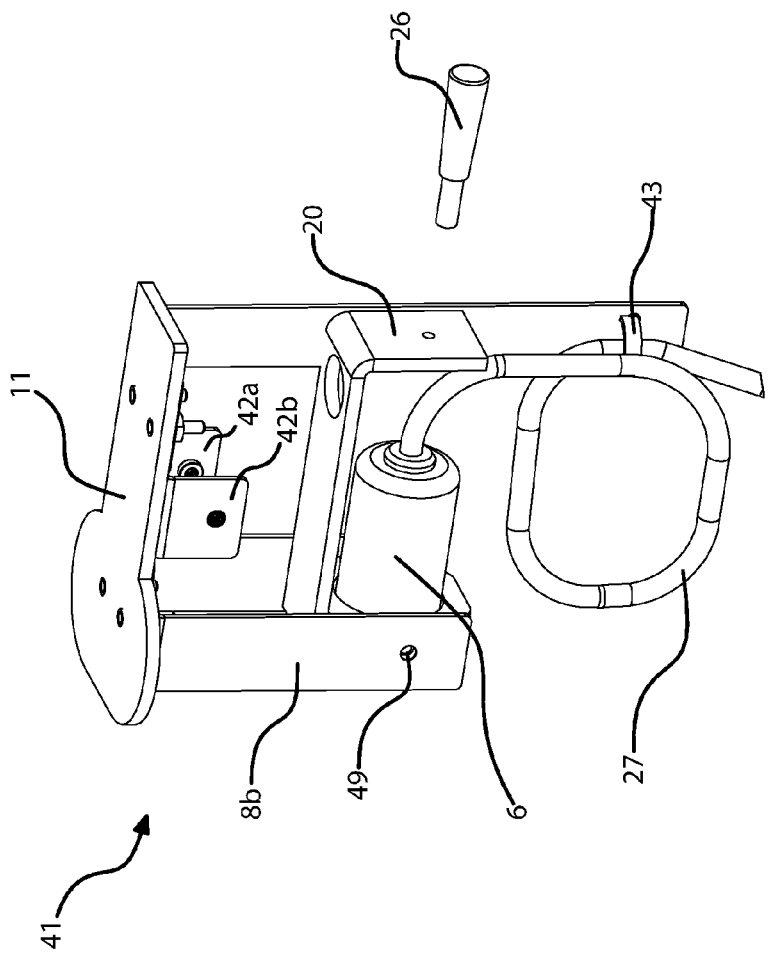
Figure 8D:
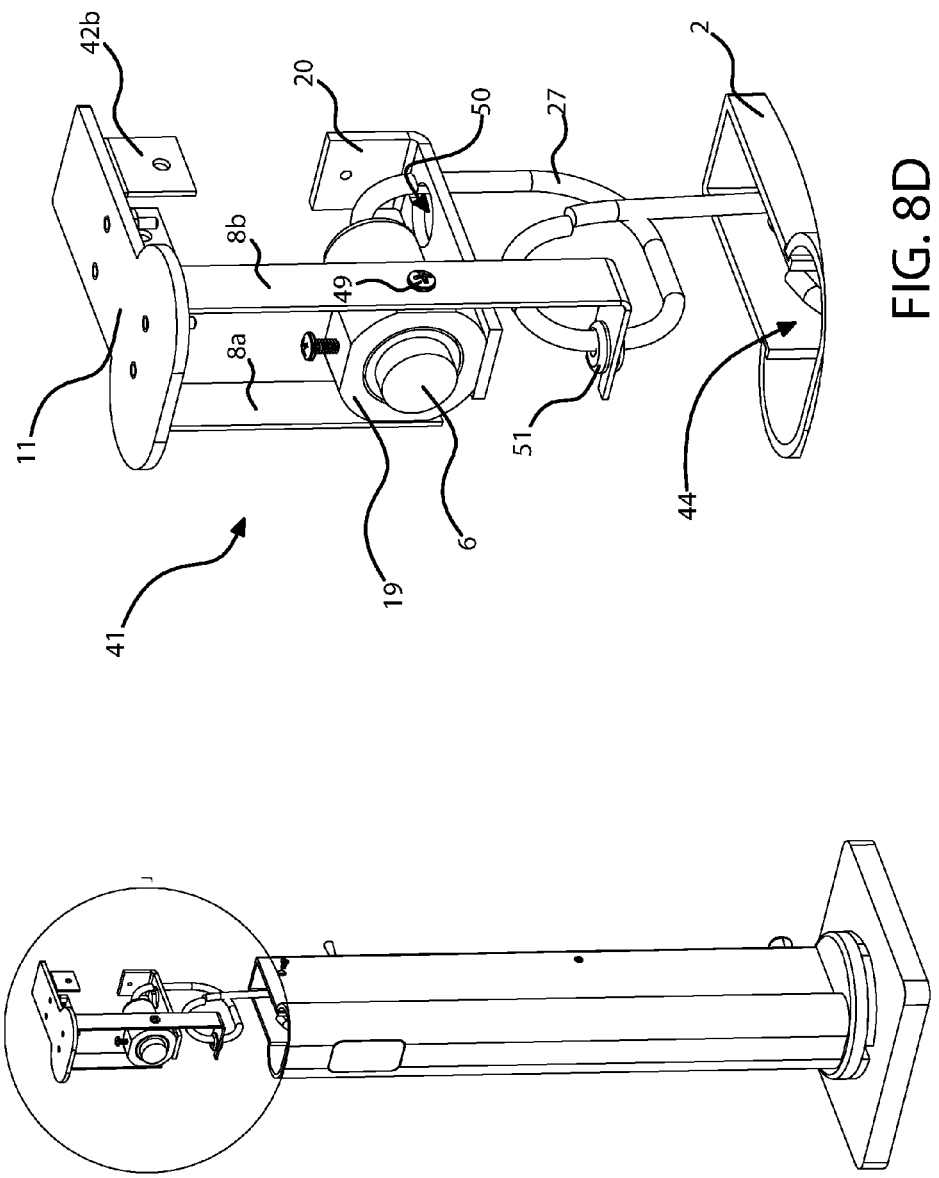
FIG. 8D is a perspective view of an alternative camera mount assembly of the camera enclosure of FIG. 1 in accordance with the present disclosure.

Referring to FIGS. 8A and 8B, perspective views of camera mounting assembly 41 are shown in accordance with the present disclosure. It is to be appreciated that the view of camera mounting assembly 41 shown in FIG. 8B is a close-up view of what is contained in the circle drawn on the left portion of FIG. 8B over enclosure 100. Also, it is to be appreciated that the view of camera mounting assembly 41 shown in FIG. 8D is a close-up view of what is contained in the circle drawn on the left portion of FIG. 8D over enclosure 100. Camera mounting assembly 41 includes camera mount 19, extension members 8a, 8b, 47, fastening or fixing member 43, and camera tilting member 20. Extension members 8a, 8b, 47 each are coupled to lid 11 and extend perpendicularly from a surface of lid 11 to interior 44 of main body 2. Extension members 8a, 8b are further coupled to camera mount 19. As shown in FIG. 8C, camera mount 19 includes an aperture 48. Camera mount 19 is configured, such that, camera 6 is disposed through aperture 48 and mounted to camera mount 19. Although not shown, in one embodiment, camera mount 19 may include a fastening member (e.g., a screw) configured to fasten camera 6 camera mount 19 when camera 6 is disposed through aperture 48.

Camera mount 19 is also coupled to camera tilting member 20, where tilting member 20 is further coupled lever 26. As described above, lever 26 is disposed through slot 30 of main body 2. When lever 26 is advanced in slot 30 toward lid 11 (best seen in FIG. 6C), tilting member 20 is tilted in a direction toward lid 11, thereby tilting camera mount 19 about a pivot point 49. When camera mount 19 is pivoted or tilted about pivot point 49, camera 6 is also tilted about pivot point 49. In this way, when lever 26 is advanced in a direction toward side 45 of main body 2, camera 6 is tilted in a direction toward side 46 of main body 2 and when lever 26 is advanced in a direction toward side 46 of main body 2, camera 6 is tilted in a direction toward side 45 of main body 2. It is to be appreciated that pivot point 49 may be any type of connection between extension members 8a, 8b and camera mount 19 that enables camera mount 19 to be tilted or pivoted about pivot point 49.

Cable 27 is disposed through a fixing or mounting member 43. Fixing or mounting member 43 is coupled to extension member 47 and is configured to mount cable 27 fixedly to extension member 47. As shown in FIGS. 8A and 8B, cable 27 is mounted to extension member 47, such that, a certain amount of excess cable (i.e., slack) of cable 27 is maintained between fixing member 43 and camera 6. In other words, the length of the cable maintained between fixing member 43 and camera 6 is greater than the distance between fixing member 43 and camera 6. It is to be appreciated that the slack in cable 27 between fixing member 43 and camera 6 is maintained so that cable 27 does not become taut and inhibit the tilting of camera mount 19 and camera 6 by pulling on camera 6 when lever 26 is advanced in slot 30.

It is to be appreciated that camera mounting assembly 41 may further include extension members 42a, 42b, as shown in FIGS. 8A and 8B. Extension members 42a and 42b are configured to extend into interior 44 of main body 2 to be fixed to an inner wall of interior 44 of main body 2. In this way, extension members 42a, 42b are configured to secure lid 11 to main body 2.

It is to be appreciated that further configurations of mounting assembly 41 are contemplated within the scope of the present disclosure. For example, referring to FIG. 8D, another embodiment of a camera mounting assembly 41 is shown in accordance with the present disclosure. In assembly 41 shown in FIG. 8D, extension member 47 has been removed. Furthermore, titling member 20 includes an aperture 50, such that, cable 27 is disposed through aperture 50 of titling member 20. Aperture 50 is configured to guide cable 27 in a direction toward the interior 44 of main body 2. Additionally, in this embodiment, extension member 8B extends past pivot point 49 and includes a grommet 51 configured such that cable 27 may be looped through grommet 51 before extending into the interior 44 of main body 2. Grommet 51 is configured, such that, slack is maintained in cable 27 so as not to impede the tilting of camera 6 (as described above).

Figure 9B:
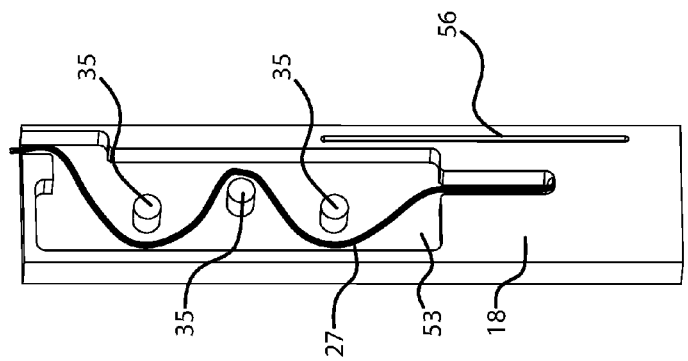
FIG. 9B is a cross-sectional perspective view of a beam of the camera enclosure of FIG. 1 including a plurality of posts in accordance with the present disclosure.
Figure 9A:
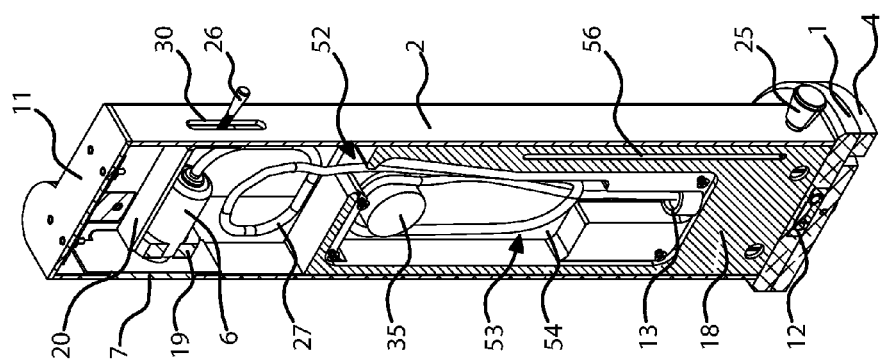
FIG. 9A is a cross-sectional perspective view of the camera enclosure of FIG. 1 in accordance with the present disclosure.

Referring to FIG. 9A, a cross-sectional perspective view of enclosure 100 is shown in accordance with the present disclosure. As seen in FIG. 9A, cable 27 of camera 6 passes through an aperture 52 of beam 18 into a compartment 53 of beam 18. In one embodiment, compartment 53 of beam 18 includes a post or guide 35 that extends perpendicularly from an interior wall 54 of compartment 53. In one embodiment, cable 27 is looped around post 35, allowing an excess amount of cable 27 (i.e., slack) to form within compartment 53. In other words, the length of the portion of cable 27 within compartment 53 is greater than the distance within compartment 53 from a the side of compartment 53 where a portion of conduit 13 is disposed through and an opposite side of compartment 53 along the longitudinal axis 80 where aperture 52 is disposed. The slack or excess amount of cable 27 maintained by post or guide 35 within compartment 53 enables cable 27 to accommodate the sliding of main body 2 over beam 18, such that, cable 27 does not become taut and hinder the slider of main body 2 or the titling of camera 6. It is to be appreciated that the width of post 35 (i.e., the distance that post 35 extends from wall 54) is chosen so that the loop formed around post 35 by cable 27 cannot be common undone. In this way, post 35 is configured to prevent cable 35 from becoming tangled within compartment 53.

Figure 10A:
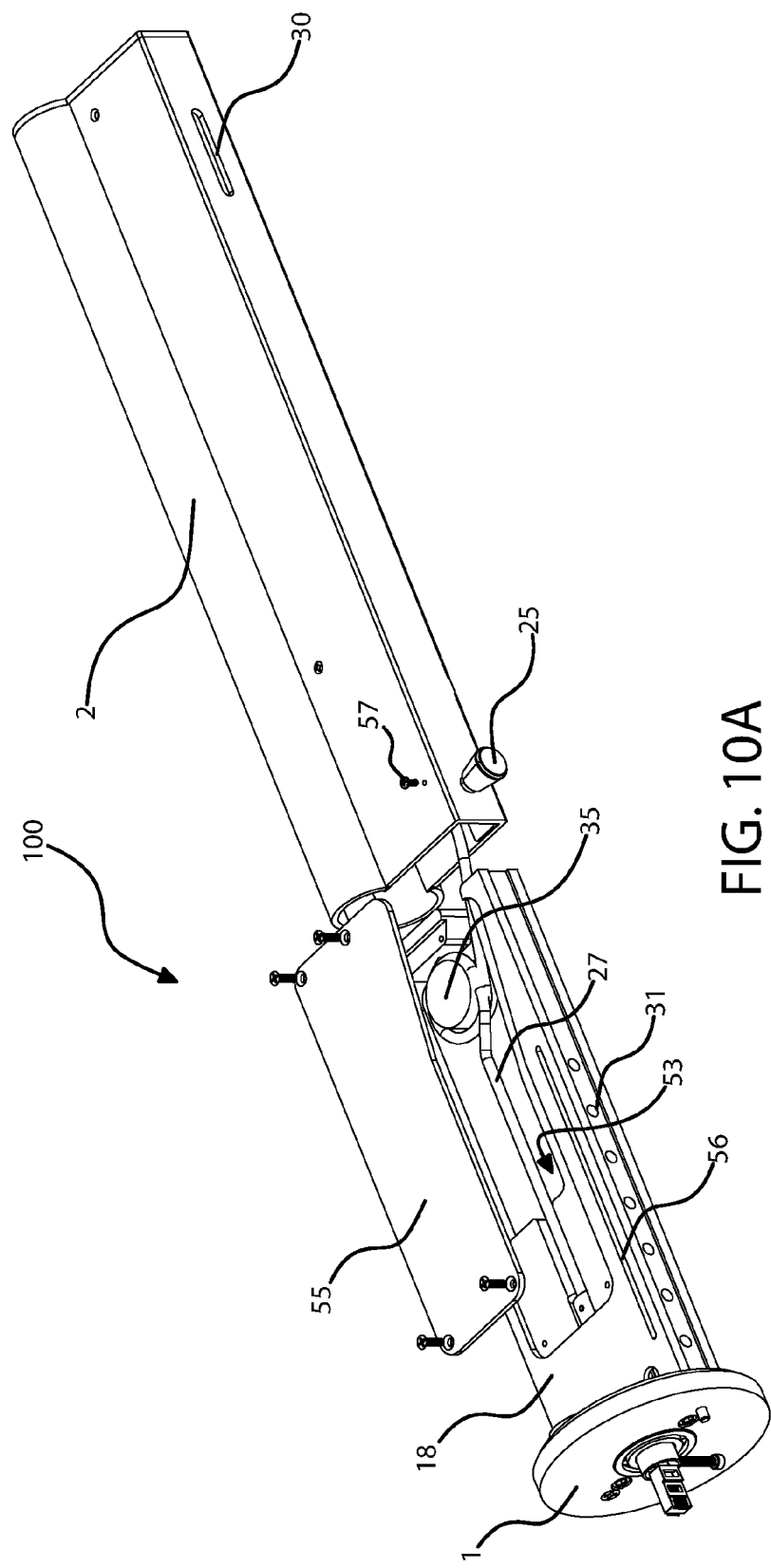
FIG. 10A is a perspective view of the camera enclosure of FIG. 1 with a beam of the camera enclosure removed from an interior of a main body of the camera enclosure in accordance with an embodiment of the present disclosure.

For example, referring to FIG. 10A, a perspective view of enclosure 100 is shown with beam 18 removed from the interior of main body 2. In one embodiment, as shown in FIG. 10A, beam 18 may include a removable cover 55 that is configured to allow a user access to compartment 53. In one embodiment, the post 35 extends from wall 54, such that, when cover 55 is coupled to beam 18, post 35 is simultaneously touching both cover 55 and wall 54. In this way, the loop around post 35 formed by cable 27 cannot become undone and cable 35 is prevented from becoming tangled and the slack in cable 27 is maintained within compartment 53.

It is to be appreciated that in other embodiments, compartment 53 of beam 18 may include more than one post or guide 35. For example, referring to FIG. 9B, an alternative embodiment of beam 18 is shown in accordance with the present disclosure. As shown in FIG. 9B, compartment 53 may include a plurality of posts or guides 35 that extend perpendicularly from inner wall 54. Each post or guide 35 is configured to guide cable 27 within compartment 53 and maintain a certain amount of slack so as not to impede the sliding of main body 2 over beam 18 or the tilting of camber 6 if cable 27 were to become taut when main body 2 is advanced in a direction along the longitudinal axis 80 away from base 1 along beam 18. Furthermore, it is to be appreciated that guides 35 shown in FIG. 9B are configured to prevent cable 27 from becoming tangled within compartment 53.

Figure 9C:
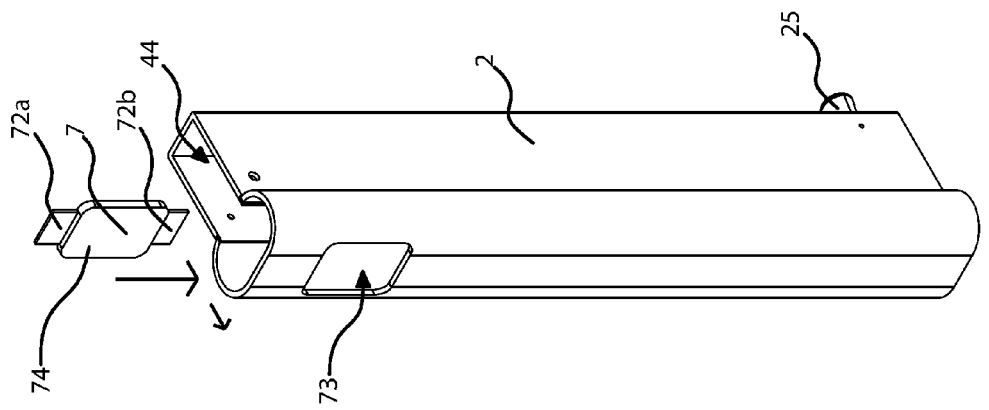
FIG. 9C is a perspective view of the camera enclosure of FIG. 1 and a glass window of the camera enclosure of FIG. 1 in accordance with the present disclosure.

Referring again to FIG. 9A, window 7 is shown coupled to main body 2. In one embodiment, window 7 is made of glass and is configured to be mounted to a wall of interior 44 of main body 2, such that, window 7 is disposed through an aperture of main body 2. For example, referring to FIG. 9C, main body 2 may include an aperture 73 configured to receive window 7. Window 7 may include window mounting members 72a, 72b, each configured to be mounted to a wall of interior 44 of main body 2. It is to be appreciated that in one embodiment, mounting members 72a, 72b, are recessed with respect to surface 74 (i.e., the surface that faces the exterior of enclosure 100) of window 7. In this way, when mounting members 72a, 72b are coupled to the wall of interior 44 of main body 2, window 7 extends into aperture 73. In another embodiment, mounting members 72a, 72b may be removed from window 7 and window 7 may be directly coupled to an inner circumference of aperture 73. It is to be appreciated that window 7 is configured to protect camera 6 from being exposed to elements exterior to main body 2 while still allowing the lens of camera 6 to view the exterior of main body 2.

As stated above, enclosure 100 is configured such that main body 2 may be advanced or retracted by a user along longitudinal axis 80 over beam 18 in a direction away from base 1 or toward base 1. Referring to FIG. 10A, in one embodiment, beam 18 may include a slot 56 and a plurality of apertures 31, where slot 56 of apertures 31 are arranged along a direction parallel to axis 80. When beam 18 is disposed in the interior 44 of main body 2, a projection 57 is configured to extend from an inner wall of main body 2 into slot 56. The projection 57 and slot 56 are configured to enable main body 2 to track properly as it slides over beam 18 and define and limit the advancement and retraction of main body 2 in the longitudinal direction 80. The length of slot 56 may be chosen as desired to determine or limit the distance main body 2 may be advanced away from base 1 along longitudinal direction 80.

Furthermore, a projection of camera height adjuster 25 is received by one of the plurality of apertures 31. In one embodiment, camera height adjuster 25 is configured as a spring plunger, where a spring in camera height adjuster 25 biases a cylindrical plunger of camera height adjuster 25 into a desired aperture 31 of beam 18. The spring plunger may include a knob that extends from the wall of the housing in a direction away from the housing. It is to be appreciated that any number of apertures 31 may be included in beam 18 and the apertures 31 may be spaced as desired to enable a user to advance main body 2 to several heights in relation to base 1 and maintain the desired height.

Figure 10B:
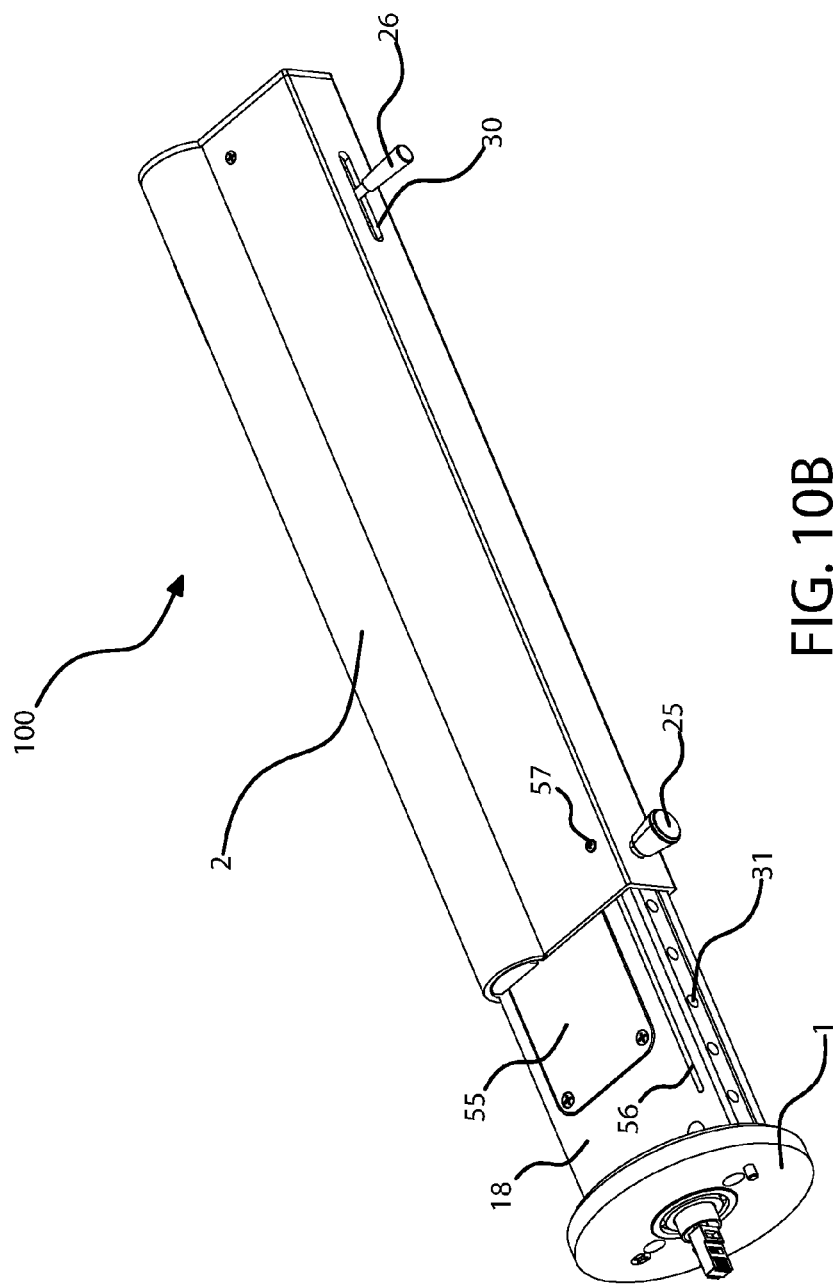
FIG. 10B is a perspective view of the camera enclosure of FIG. 1, where the main body of the camera enclosure has been advanced along a longitudinal axis of the camera enclosure in accordance with the present disclosure.

To advance main body 2 along beam 18, a user may pull camera height adjustor 25 (e.g., pull the knob described above) in a direction away from main body 2 (i.e., perpendicularly to longitudinal axis 80) to release the projection of adjustor 25 from an aperture 31 of beam 18. Then, the user may freely extend or retract main body 2 along longitudinal axis 80 away from or toward base 1 over beam 18 to achieve a desired height for camera 6. When the spring plunger aligns with an aperture 31 such that the desired height of main body 2 is achieved, the knob of the spring plunger 25 is released by the user and the spring plunger 25 is advanced into the desired aperture 31 to maintain the selected or height of main body 2 in relation to beam 18. In FIG. 10B, a perspective view of enclosure 100 is shown, where main body 2 has been advanced in a direction away from base 1 along longitudinal axis 80.

Figure 11A:
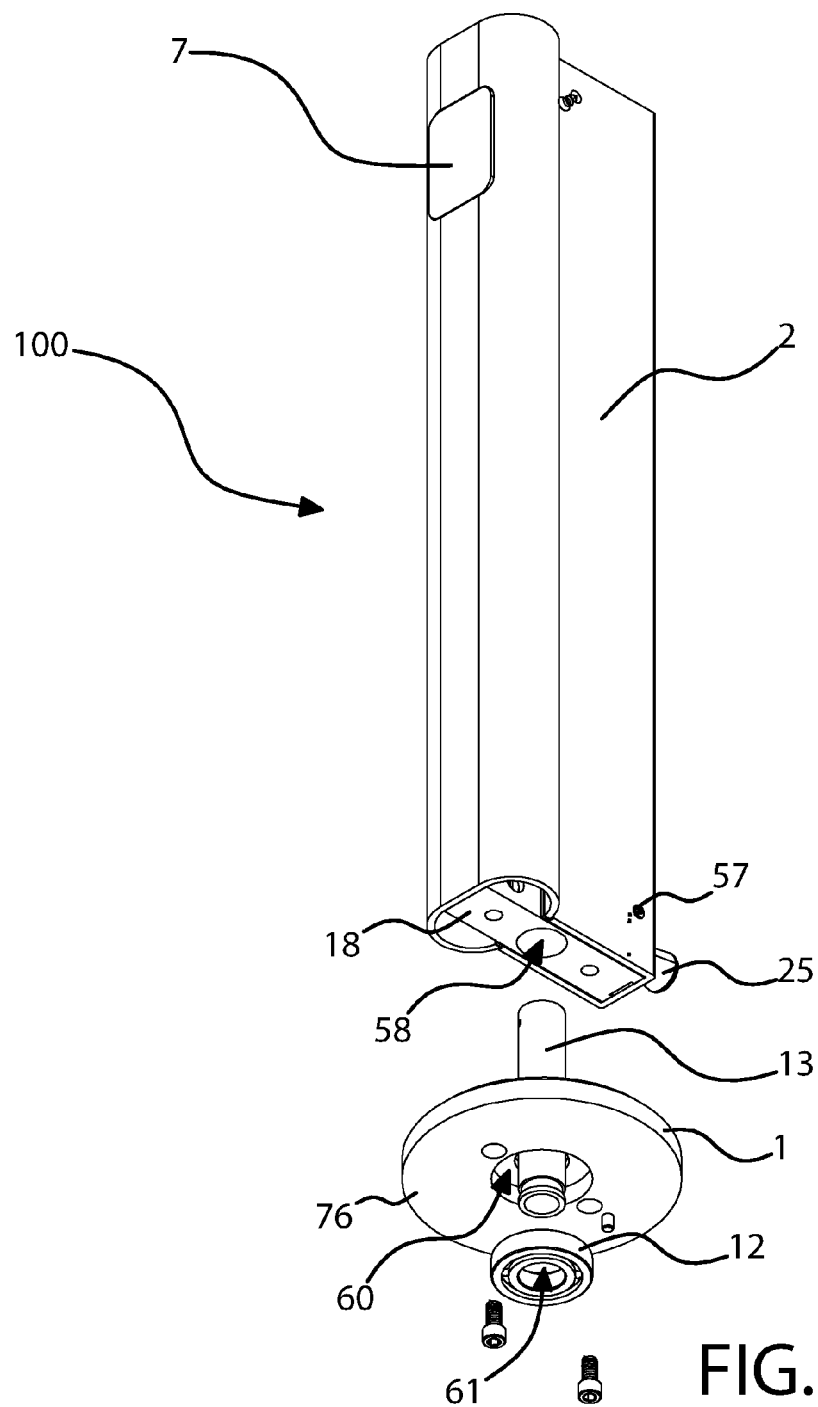
FIG. 11A is a bottom perspective view of the camera enclosure of FIG. 1 with a conduit, a base, and a bearing decoupled from the enclosure and shown in an exploded perspective view in accordance with the present disclosure.
Figure 11B:
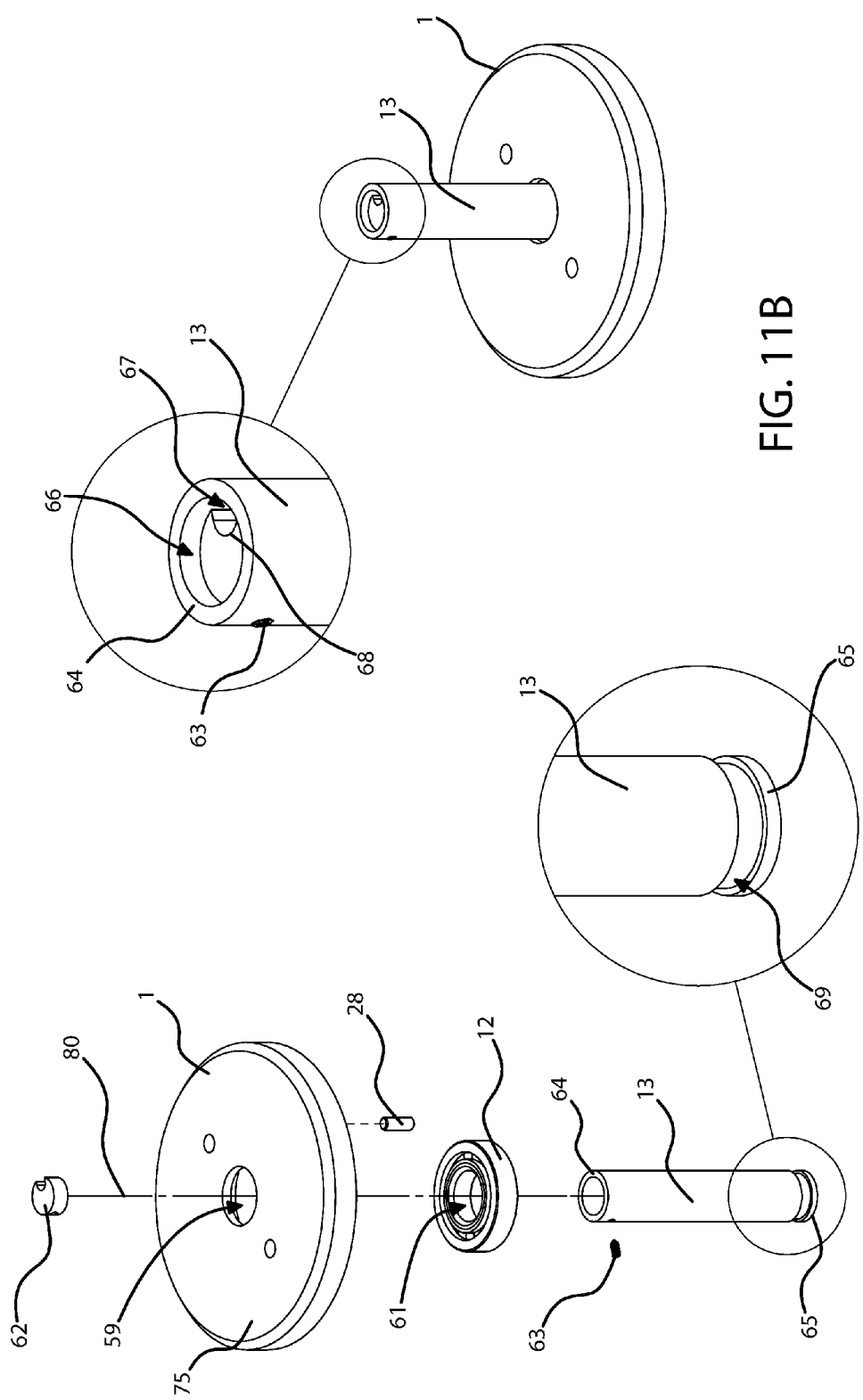
FIG. 11B includes perspective views of several components of the camera enclosure of FIG. 1 in accordance with the present disclosure.

As shown in FIG. 9A, cable 27 is disposed through hollow interior 66 (shown in FIG. 11B) of conduit 13, where conduit 13 is disposed through an aperture 58 (shown in FIG. 11A) of beam 18. Referring to FIGS. 11A and 11B, conduit 13 is disposed through aperture 58 of beam 18, through aperture 59 of base 1, through aperture 61 of bearing 12. As will be described in greater detail below, conduit 13 is also disposed through an aperture of mounting plate 58. In one embodiment, base 1 includes a slot 60 embedded in surface 76 of base 1, where slot 60 is configured to receive bearing 12, such that, bearing 12 is flush with the surface 76 when bearing 12 is disposed in slot 60. In one embodiment, bearing 12 is coupled to slot 60 of base 1 and the exterior wall of conduit 13, such that, bearing 12 is configured to enable base 1 to be rotated about conduit 13 and longitudinal axis 80, as will be described in greater detail below. It is to be appreciated that in one embodiment, bearing 12 is a ball bearing.

As shown in FIG. 11B conduit 13 includes ends 64 and 65, where end 64 of conduit 13 extends into compartment 53 of beam 18 (best seen in FIG. 9A). The interior 66 of conduit 13 is configured to receive a wire holder 62, such that, wire holder 62 is configured to be coupled to the inner wall of interior 66 of conduit 13 via a fastening member 63. When wire holder 62 is coupled to the interior 66 of conduit 13, an aperture 67 is formed between end 68 of wire holder 62 and the inner wall of interior 66 of conduit 13. When cable 27 is disposed through interior 66 of conduit 13, the circumference of aperture 67 is configured to secure cable 27 between an edge 68 of wire holder 62 and the inner wall of interior 66 of conduit 13. In this way, when wire holder 62 is coupled to the interior 66 of conduit 13, cable 27 is prevented from moving within the interior 66 of conduit 13.

It is to be appreciated that since cable 27 is fastened to extension member 47 via fastening or fixing member 43 and to the inner wall of interior 66 of conduit 13, the length of cable 27 within enclosure 100 is kept constant even when main body 2 is advanced or retracted in a longitudinal direction. In this way, fastening member 43 and wire holder 62 along with guide 35 are configured to maintain the correct amount of slack in cable 27 within the interior of main body 2 and compartment 53. For the reasons stated above, this ensures that the titling of camera 6 and the extension and retraction of main body 2 along longitudinal axis 80 is not impeded by tautness in cable 27.

Figure 11C:
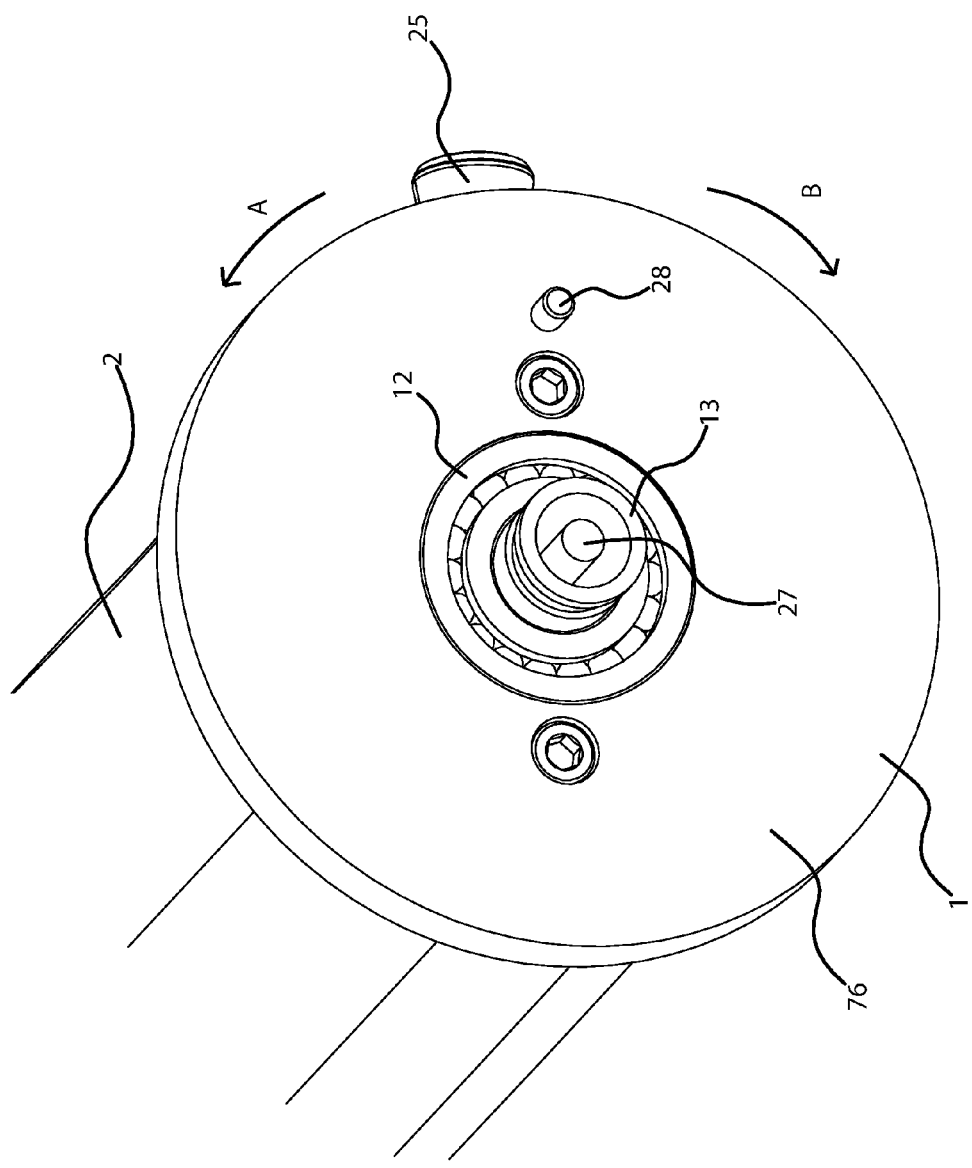
FIG. 11C is a partial bottom perspective view of the camera enclosure of FIG. 1 with a mounting plate of the camera enclosure removed in accordance with the present disclosure.
Figure 11D:
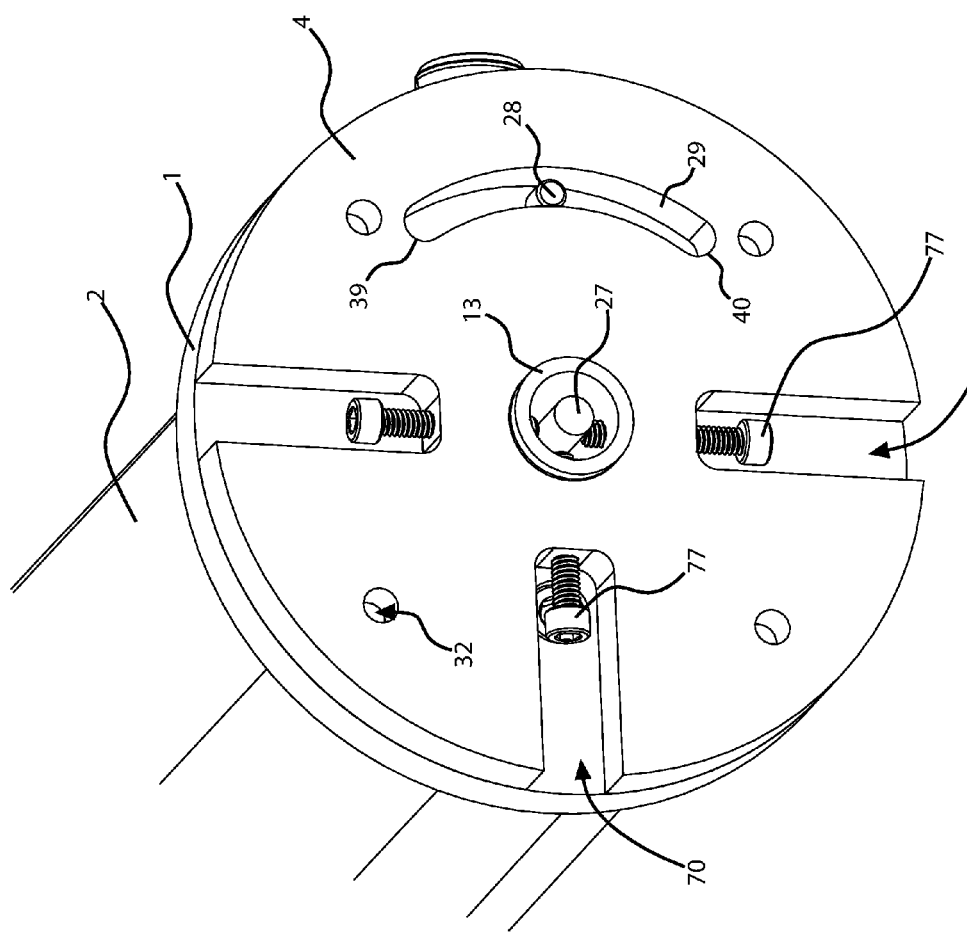
FIG. 11D is a partial bottom perspective view of the camera enclosure of FIG. 1 with the mounting plate of the camera enclosure included in accordance with the present disclosure.

Turning to FIG. 11C, a bottom perspective view of base 1 coupled to beam 18 is shown in according in accordance with an embodiment of the present disclosure. As seen in FIG. 11C, a pin or extension member 28 extends perpendicularly from a surface 76 of base 1. As described above, conduit 13 extends through bearing 12, where a portion of cable 27 is disposed through the hollow interior 66 of conduit 13. Turning to FIG. 11D, mounting plate 4 is shown coupled to base 1, such that pin 28 extends through a slot 29 of mounting plate 4, where pin 28 and slot 29 are configured to define and limit the rotation of base 1 about longitudinal axis 80 as will be described in greater detail below.

When mounting plate 4 is coupled to base 1, end 65 of conduit 13 is disposed through an aperture of mounting plate 4. As shown in FIG. 11D, mounting plate 4 includes a plurality of slots 70 configured to receive one or more fasteners 77. The fasteners 77 may be advanced through an aperture within each of slots 70 to fasten mounting plate 4 to conduit 13. As shown in FIG. 11B, in one embodiment, conduit 13 may include a slot 69 to receive each end of each fastener 77. When the ends of fastener 77 are disposed in slot 69, conduit 13 is held rigidly to mounting plate 4. In one embodiment, an adhesive may also be used to couple bearing 12 to slot 60 and the exterior of conduit 13.

Figure 12:
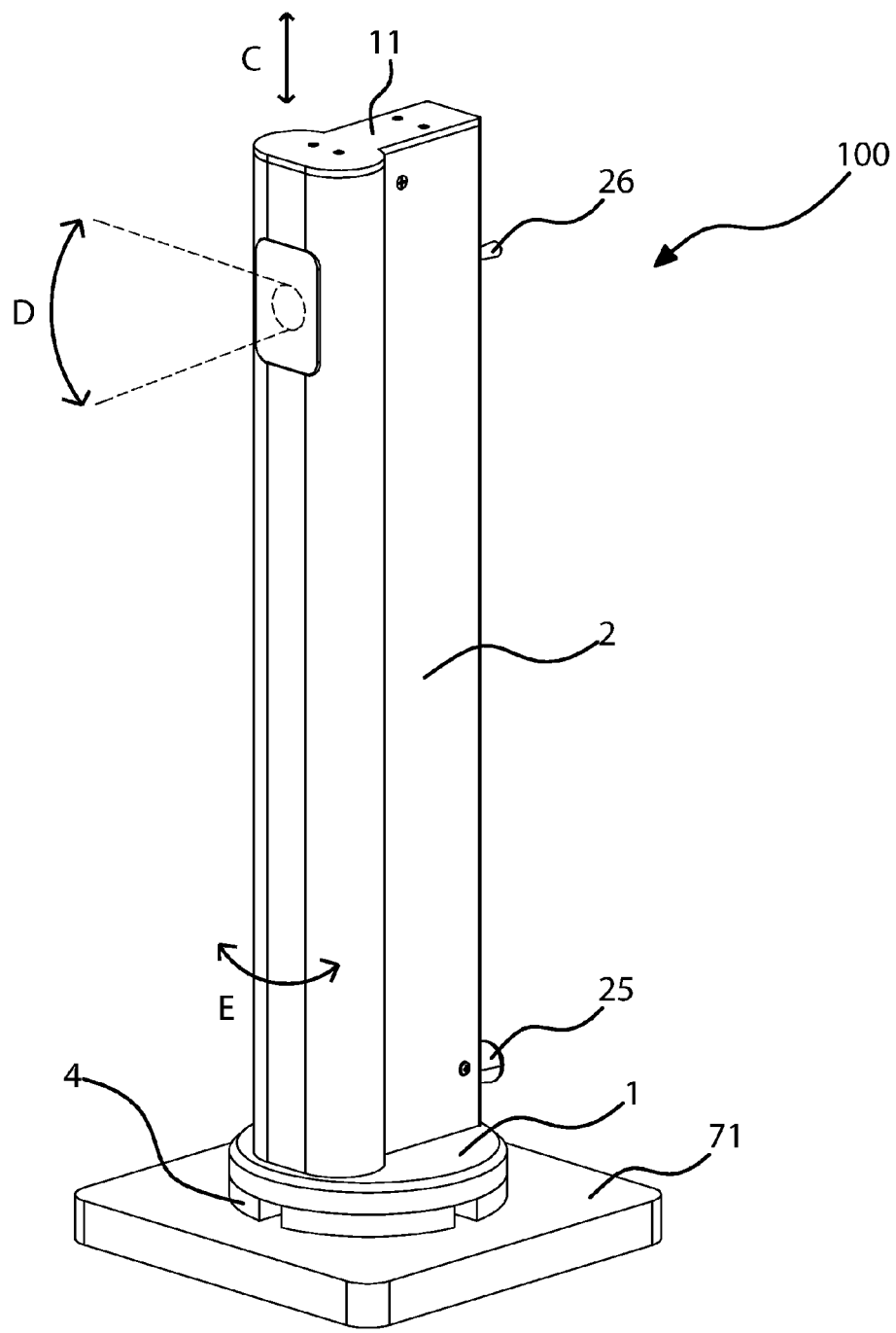
FIG. 12 is a perspective view of the camera enclosure of FIG. 1 mounted to a countertop in accordance with the present disclosure.

It is to be appreciated that, in one embodiment of the present disclosure, mounting plate 4 is configured to be mounted to a countertop (e.g., countertop 71 shown in FIG. 12). The countertop may include a pre-drilled aperture of a sufficient size to allow side 65 of conduit 13 to pass through the aperture of the countertop. Mounting plate 4 may be secured to the countertop by advancing one or more screws or bolts through one or more apertures 32 of mounting plate 32 into the countertop. Once mounting plate 4 has been secured to the countertop, cable 27 extends from compartment 53, through first side 64 of conduit 13 into hollow interior 66 and out of side 65 of conduit 13 and may be coupled to a power source and/or a computer disposed on a side of the countertop that is opposite to the side that mounting plate 4 is coupled to (e.g., underneath the countertop, within a desk, etc.). It is to be appreciated that in one embodiment, cable 27 is configured as an RJ-45 cable, where the end of cable 27 that extends through the hollow interior 66 and out of end 65 of conduit 13 is configured as an RJ-45 connector that may be connected to an RJ-45 receptacle of a computing device disposed underneath the countertop that enclosure 100 is mounted to.

In use, base 1 of enclosure 100 can be rotated (for example, by manually rotating main body 2) clock-wise or counter-clockwise about longitudinal axis 80 via bearing 12 while mounting plate 4 remains in a fixed position secured to a countertop (e.g., countertop 71 shown in FIG. 12). It is to be appreciated that the length of slot 29 determines the amount that base 1 of enclosure 100 can be rotated about longitudinal axis 80. For example, when base 1 of enclosure 100 is rotated in a direction A, as shown in FIG. 11C, pin 28 will be advanced along slot 28, as shown in FIG. 11D, until pin 28 reaches end 39 of slot 29. When pin 28 reaches end 39 of slot 29, the user will not be able to rotate base 1 in the direction A any further. Alternatively, when base 1 of enclosure 100 is rotated in a direction B, as shown in FIG. 11C, pin 28 will be advanced along slot 28, as shown in FIG. 11D, until pin 28 reaches end 40 of slot 29. When pin 28 reaches end 40 of slot 29, the user will not be able to rotate base 1 in the direction B any further.

Referring to FIG. 12, adjustable camera enclosure 100 is shown mounted to a counter top 71. In use, the camera 6 housed within enclosure 100 may be advanced or retracted (by advancing or retracting main body 2) toward base 1 or away from base 1 (as indicated by letter C in FIG. 12) along longitudinal axis 80, rotated clockwise or counter clockwise (by rotating base 1) about longitudinal axis 80 (as indicated by letter E in FIG. 12), and tilted (via lever 26) in a direction toward base 1 or away from base 1 (as indicated by letter D in FIG. 12) to achieve a plurality of positions and viewing angles.

The adjustable camera enclosure 100 provides many advantages. In one exemplary use, the enclosure 100 may be mounted to a countertop within a commercial setting to take pictures and/or videos of clients. For example, the camera enclosure 100 may be used by a bank teller, cashier, or customer service representative to adjust the viewing angle of camera 6 to ensure a clear picture of a desired target is recorded. Additionally, the cable 27 within camera enclosure 100 may be routed via conduit 13 to one or more devices within the desk of countertop 71 (as described above). It is to be appreciated that camera cable 27 may include multiple cables or wires associated with the operation for camera 6. For example, in one embodiment, camera 6 includes a power cable to provide power to camera 6, and a data transfer cable to allow camera 6 to transfer data to a computer that is coupled to camera 6 via cable 27. In one embodiment, cable 27 is an RJ-45 cable, as described above.

It is to be appreciated that camera enclosure 100 is configured for use with any one of a plurality of different miniature pin hole and/or stick cameras 6. For example, camera 6 may be, but is not limited to, an IP network high-performance camera, a high-definition HD camera, a camera including night and/or thermal vision, etc. In one embodiment, camera 6 may be used to capture photographs and/or videos. In some embodiments, camera 6 may also have audio recording capabilities. In one embodiment, camera 6 is configured to communicate wirelessly with a remote computing device via a wireless network (e.g., Wi-Fi, 3G, 4G, LTE, etc.)

In one embodiment, main body 2 may be made of aluminum or any other suitable light-weight, durable material.

It is to be appreciated that the various features shown and described are interchangeable, that is a feature shown in one embodiment may be incorporated into another embodiment.

Although embodiments which incorporate the teachings of the present disclosure have been shown and described in detail herein, those skilled in the art can readily devise many other varied embodiments that still incorporate these teachings. Having described preferred embodiments of an adjustable camera enclosure (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure.

What is claimed is:

1. An apparatus comprising:
    a housing including a hollow interior defining a longitudinal axis, the housing including a first end and a second end and at least one aperture in a wall of the housing;
    a beam including a first end and a second end, the first end of the beam disposed through the second end of the housing into the hollow interior of the housing such that the beam is disposed along the longitudinal axis, wherein the housing is configured to be slidable over the beam along the longitudinal axis to extend and retract the housing relative to the beam;
    the hollow interior of the housing configured to receive a camera such that a lens of the camera is oriented to the at least one aperture of the housing; and
    a base coupled to the second end of the beam, wherein the base is configured to be rotatable about the longitudinal axis to rotate the beam and the housing about the longitudinal axis.

2. The apparatus of claim 1, further comprising a mounting member coupled to the base such that the base is rotatable about the mounting member, wherein the mounting member is configured to be fixedly mounted to a surface.

3. The apparatus of claim 2, wherein the camera includes at least one cable and the beam includes a compartment disposed within the interior of the beam and wherein at least a portion of the cable is disposed within the compartment.

4. The apparatus of claim 3, wherein the beam, the base and the mounting member each include an aperture, the aperture of the beam disposed on the second end of the beam, and the apertures of the beam, the base, and the mounting member each align, wherein the apparatus further comprises a conduit including a first end and a second end and a hollow interior, the conduit disposed through each of the apertures of the beam, the base, and the mounting member such that the first end of the conduit extends into the compartment of the beam, the conduit fixedly coupled to the mounting member.

5. The apparatus of claim 4, wherein the second end of the conduit is disposed through an aperture of the surface and the cable extends from the compartment through the first end of the conduit into the hollow interior of the conduit and out of the second end of the conduit, the cable configured to be coupled to at least one computing device.

6. The apparatus of claim 5, further comprising a bearing including an aperture, wherein the base includes a slot in a surface of the base, the slot configured to receive the bearing such that the aperture of the bearing is aligned with the apertures of the beam, the base, and the mounting member and the conduit is disposed through and coupled to the bearing, the bearing configured to enable the base to rotate about the conduit.

7. The apparatus of claim 6, wherein the mounting member includes a slot and the base includes an extension member extending perpendicularly from the surface of the base into the slot of the mounting member, the slot of the mounting member and the extension member of the base configured to limit the rotational motion of the base relative to the mounting member.

8. The apparatus of claim 3, wherein the length of the at least a portion of the cable disposed within the compartment is greater than the distance from a first side of the compartment to an opposite side of the compartment along the longitudinal axis.

9. The apparatus of claim 8, wherein the compartment includes an inner wall and at least one guide that extends from the inner wall in a direction perpendicular to the longitudinal axis, the at least one guide configured to prevent the at least a portion of the cable from becoming tangled within the compartment and to maintain the length of the at least a portion of the cable.

10. The apparatus of claim 9, wherein the cable is looped around the at least one guide.

11. The apparatus of claim 1, wherein the beam includes a slot aligned along a direction parallel to the longitudinal axis and the housing includes an extension member extending from an inner wall of the housing into the slot of the beam, the slot of the beam and extension member of the housing configured to define and limit the extension and retraction of the housing over the beam along the longitudinal axis.

12. The apparatus of claim 1, wherein the beam includes a plurality of apertures aligned along a direction parallel to the longitudinal axis and the housing includes a spring plunger disposed through a wall of the housing, the spring plunger biased toward the hollow interior of the housing, each of the plurality of apertures configured to receive the spring plunger when the housing has been extended or retracted relative to the beam along the longitudinal axis such that the spring plunger is aligned with an aperture of the plurality of apertures, wherein when the spring plunger is received by the aperture of the plurality of apertures, a position of the housing relative to the beam is maintained.

13. The apparatus of claim 12, wherein the spring plunger includes a knob extending from the wall of the housing in a direction away from the housing configured such that when the knob is pulled in a direction away from the housing, the spring plunger is released from an aperture of the plurality of apertures to allow the housing to be advanced or retracted along the longitudinal axis over the beam.

14. The apparatus of claim 1, further comprising a camera mounting assembly configured to mount the camera within the hollow interior of the housing such that the camera can be tilted in a direction toward the first end of the housing or in a direction toward the second end of the housing.

15. The apparatus of claim 1, further comprising a lid coupled to the first end of the housing and a camera mounting assembly coupled to the lid and extending from the lid into the hollow interior of the housing, the camera mounting assembly configured to mount the camera within the hollow interior of the housing.

16. The apparatus of claim 15, wherein the camera mounting assembly includes a first extension member and a second extension member, each of the first extension member and the second extension member coupled to the lid and extending into the hollow interior of the housing, the camera mounting assembly further including a camera mount coupled to each of the first and second extension members, the camera mount including an aperture, the camera disposed through the aperture of the camera mount, the camera mount configured to be tilted about the first and second extension members of the camera mounting assembly to tilt the camera toward the first end of the housing or the second end of the housing.

17. The apparatus of claim 16, wherein the housing includes a slot in the wall of the housing, the slot aligned in a direction parallel to the longitudinal axis and having a first end and a second end, the first end of the slot disposed closer to the first end of the housing than the second end of the slot, the apparatus further comprising a lever disposed through the slot of the housing and coupled to the camera mount such that when the lever is advanced to the first end of the slot, the camera is tilted toward the second end of the housing, and when the lever is advanced to the second end of the slot, the camera is tilted to the first end of the housing.

18. The apparatus of claim 16, wherein the camera mounting assembly includes a third extension member coupled to the lid and extending into the hollow interior of the housing, the third extension member including a fastening member configured to fasten the cable to the third extension member such that an excess amount of cable is maintained between the fastening member and the camera, wherein a length of the excess amount of cable is greater than a distance from the fastening member to the camera.

19. The apparatus of claim 1, further comprising a camera window disposed through the at least one aperture of the housing.

20. An apparatus comprising:
a housing including a hollow interior defining a longitudinal axis, the housing including a first end and a second end and at least one aperture in a wall of the housing;
a beam including a first end and a second end, the first end of the beam disposed through the second end of the housing into the hollow interior of the housing such that the beam is disposed along the longitudinal axis, wherein the housing is configured to be slidable over the beam along the longitudinal axis to extend and retract the housing relative to the beam;
the hollow interior of the housing configured to receive a camera, such that a lens of the camera is oriented to the at least one aperture of the housing;
a base coupled to the beam, wherein the base is rotatable about the longitudinal axis to rotate the beam and the housing about the longitudinal axis; and
a mounting member coupled to the base such that the base is rotatable about the mounting member, wherein the mounting member is configured to be fixedly mounted to a surface.

21. An apparatus comprising:
a housing including a hollow interior defining a longitudinal axis, the housing including a first end and a second end and at least one aperture in a wall of the housing;
a beam including a first end and a second end, the first end of the beam disposed through the second end of the housing into the hollow interior of the housing such that the beam is disposed along the longitudinal axis, wherein the housing is configured to be slidable over the beam along the longitudinal axis to extend and retract the housing relative to the beam;
a camera mounting assembly configured to mount a camera within the hollow interior of the housing such that a lens of the camera is oriented to the at least one aperture of the housing, the camera mounting assembly further configured to enable the camera to be tilted in a direction toward the first end of the housing or the second end of the housing;
a base coupled to the beam, wherein the base is rotatable about the longitudinal axis to rotate the beam and the housing about the longitudinal axis; and
a mounting member coupled to the base such that the base is rotatable about the mounting member, wherein the mounting member is configured to be fixedly mounted to a countertop surface.

* * * * *